July 8, 1952 L. L. HELTERLINE, JR 2,602,915
VOLTAGE REGULATOR
Filed May 26, 1950
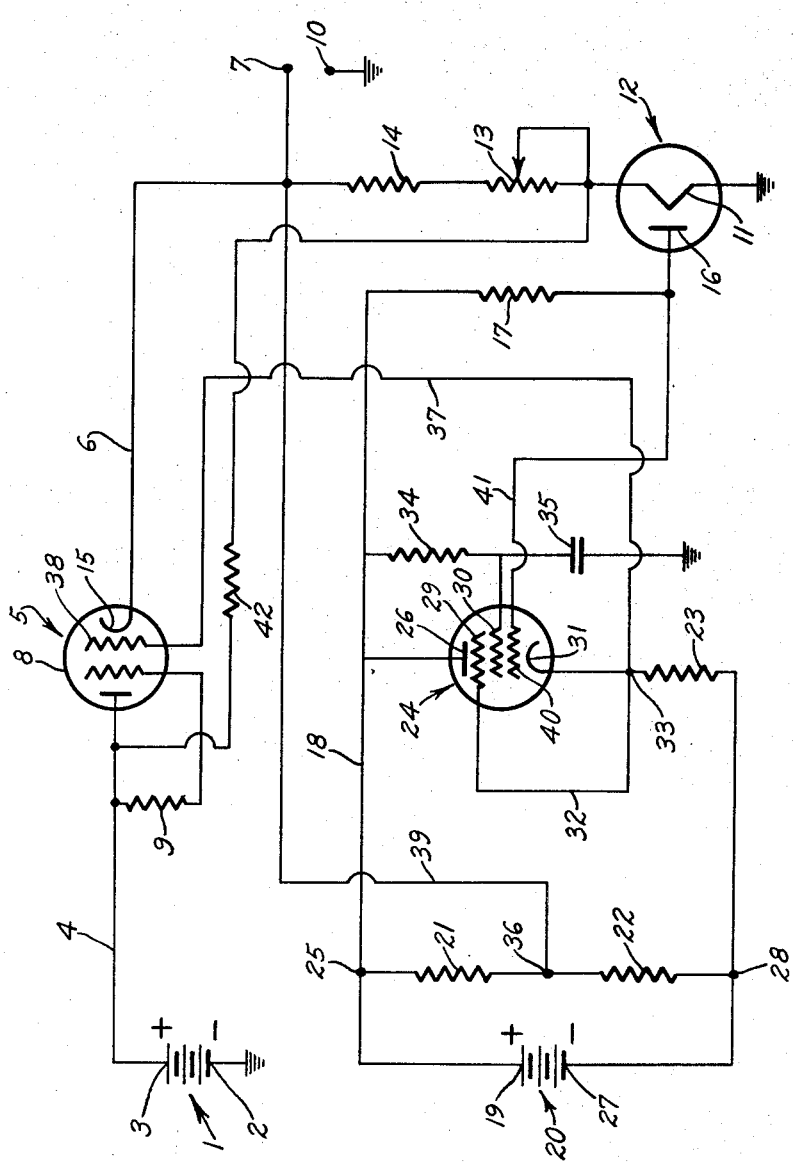
INVENTOR.
LEO L. HELTERLINE, JR
BY
Johnf Hanahan
ATTORNEY

Patented July 8, 1952

2,602,915

UNITED STATES PATENT OFFICE 2,602,915

VOLTAGE REGULATOR

Leo L. Helterline, Jr., South Norwalk, Conn., assignor to Sorensen & Company, Inc., Stamford, Conn., a corporation of Connecticut Application May 26, 1950, Serial No. 164,325

12 Claims. (Cl. 323—20)

This invention relates to voltage regulators and more particularly to a voltage regulator wherein a direct current voltage is regulated by a variable non-linear impedance in series with the load circuit.

When supplying a direct current voltage to a load, it is often desirable to regulate this voltage so that it remains substantially constant even though the load varies. The direct current voltage may be obtained from a rectifier supplied by an alternating current source in which case the direct current voltage would also vary with any fluctuation in the alternating current supply voltage. Certain regulators are limited in their application in that they operate by varying the circuit constants in the direct current rectifier or by adjusting the supply voltage thereto. One advantage of the present invention is that it does not operate on the rectifier circuit itself, but rather operates on the direct current output supplied to the load and thus is applicable for regulating a voltage supplied by a generator or some other direct current producing means.

In view of the foregoing, it is an object of the present invention to provide a simple, quick acting yet relatively accurate electronic voltage regulator.

Another object of the invention is to provide a direct current voltage regulator wherein the control is accomplished in the load circuit of the direct current power source and is thus independent of the rectifier or generator supplying the direct current voltage.

Another object of the invention is to provide a voltage regulator wherein the output voltage fed to the load may be held substantially constant at predetermined values over a predetermined voltage range even though the load or supply voltage should change.

Another object of the invention is to provide a regulator which is adapted to respond quickly to changes in either the non-regulated supply voltage, the regulated output voltage, or both.

It is still another object of the invention to provide a voltage regulator having a variable non-linear impedance in the load circuit of a direct current power source whereby the voltage drop across the non-linear impedance determines the output voltage and wherein the value of the non-linear impedance is controlled by the output of a bridge circuit.

The above and other objects of the invention will become apparent by reference to the following detailed description especially when considered in connection with the accompanying drawing wherein:

The figure is a schematic diagram of one embodiment of the present invention.

In the drawing, non-regulated direct current power supply 1 is shown for schematic purposes as a battery but it is to be understood that this is representative only and actually direct current power supply 1 may be a rectifier, the input to which is an alternating current or it may be a direct current generator. In the embodiment shown, negative terminal 2 is grounded though of course this is not imperative.

Positive terminal 3 is connected by means of conductor 4 through vacuum tube 5 and thence via conductor 6 to output terminal 7. Positive potential is applied to screen grid 8 of vacuum tube 5 by connecting said screen grid through resistance 9 to conductor 4. In the present embodiment, the other output terminal 10 is grounded inasmuch as negative terminal 2 of the non-regulated supply is likewise connected to ground. The output across terminals 7 and 10 is the regulated voltage applied to the load.

One side of a filament 11 of a diode vacuum tube 12 is connected through a variable filament limiting resistance 13 and a resistance 14 to the output terminal 7. This side of the filament is also connected through a resistance 42 to positive terminal 3 of the power supply 1 via conductor 4. The other side of filament 11 is connected to ground. In the event that terminal 2 of the non-regulated supply 1 and regulated output terminal 10 were not grounded, the other side of filament 11 would be connected to terminal 10. It is thus seen that filament 11 of vacuum tube 12 is connected across the output terminals 7 and 10 which provides the regulated supply to the load as well as across the non-regulated direct current power supply 1.

It is thus evident that the current flowing through the filament 11 comes from two separate branches of the circuit. One component is due to the voltage appearing across the output terminals 7 and 10 and flowing through the branch comprising terminal 7, resistance 14, variable resistance 13 and filament 11 to ground. The other component is due to the voltage across the supply 1 and the current due to this potential flows from positive terminal 3, through conductor 4, resistance 42 and filament 11 to ground.

The filament current is thus dependent on both the output voltage across the terminals 7 and 10 as well as on the voltage across the terminals 2 and 3 of the direct current supply 1. Resistance 14 is also connected by conductor 6 to cathode 15 of vacuum tube 5. Thus, filament 11 is also in series with cathode 15 of vacuum tube 5. In the present embodiment, filament 11 is made of pure tungsten whose temperature and hence electron emission is a function of the voltage applied thereto.

Plate 16 of vacuum tube 12 is connected through resistance 17 and thence by conductor 18 to positive terminal 19 of a suitable source of potential 20. As in the instance of potential source 1, potential source 20 is shown for schematic purposes as a battery but, as is evident to one skilled in the art, this source may be a rectifier or other direct current producing source.

Potential source 20 also provides an input voltage to a balancing network comprising a Wheatstone bridge whose arms comprise resistances 21, 22, 23 and vacuum tube 24. This input voltage is applied by connecting positive terminal 19 of potential source 20 to the terminal 25 which is directly connected to the resistance 21 and to a plate 26 of a vacuum tube 24 by conductor 18, and by connecting negative terminal 27 of potential source 20 to a terminal 28 which is an electrical junction for bridge resistances 22 and 23.

Suppressor grid 29 and screen grid 30 of the vacuum tube 24 are connected in a conventional manner, the former being connected directly to the cathode 31 of vacuum tube 24 by conductor 32. Cathode 31 is also connected at terminal 33 to the bridge arm comprising resistance 23. Screen grid 30 is connected through resistance 34 via conductor 18 to positive terminal 19 of potential source 20. Screen grid 30 is also connected to ground through a capacitor 35. The output terminals of the Wheatstone bridge are the terminal 33 mentioned above and a terminal 36 which is at the junction of bridge resistance arms 21 and 22.

Output terminal 33 is connected by conductor 37 to the control grid 38 of the vacuum tube 5 and output terminal 36 is connected by conductor 39 to regulated output terminal 7 which is electrically connected to cathode 15 of vacuum tube 5. Thus, it is evident that the output of the bridge is fed to the control circuit of vacuum tube 5 and hence the output of vacuum tube 5 is adapted to respond to the output of the bridge.

Vacuum tube 24 of the bridge, comprising resistance arms 21, 22, 23 and said vacuum tube, is the variable component of said bridge. Control grid 40 of vacuum tube 24 is connected to the plate 16 of vacuum tube 12 by means of a conductor 41. Thus, any change in the plate current of vacuum tube 12, due to a change in its filament current, causes a change in the voltage across resistance 17 and a concomitant change in the potential of grid 40 and plate current of vacuum tube 24. This change in plate current produces a change in potential across terminals 33 and 36 and a resultant change in the voltage across the control circuit of vacuum tube 5.

The sequence of operation may be understood by assuming that the voltage across regulated output terminals 7 and 10 tends to rise. Under such a condition, an increased current will flow through resistance 14, variable resistance 13 and filament 11. Thus, the voltage across filament 11 will likewise increase. This rise in filament voltage will raise the temperature of filament 11 thereby causing an increased electron emission therefrom. The increased emission results in a greater plate current through vacuum tube 12 and its plate resistance 17. The increased current flow through resistance 17 causes an increased voltage drop across said resistance and a corresponding decrease in the potential of plate 16.

As plate 16 is connected directly to control grid 40 of vacuum tube 24, there is a like decrease in the potential of control grid 40. The decrease in the potential of control grid 40 causes a decrease in plate current flowing through vacuum tube 24 which as heretofore mentioned is the variable arm of the bridge. This decrease in plate current causes a decrease in the potential of cathode 31 and a resulting unbalance in the bridge. Although the potential of cathode 31 follows the potential of control grid 40, that is a decrease in control grid potential likewise results in a decrease in cathode potential, the signal appearing at cathode 31 is of a greater magnitude than that appearing on control grid 40 due to the amplification properties of vacuum tube 24.

As the potential of cathode 31 decreases, the potential appearing across bridge output terminals 33 and 36 has likewise decreased and the decreased potential is transmitted over conductors 37 and 39 to the control circuit of vacuum tube 5 which comprises control grid 38 and cathode 15. The decrease in potential across the control circuit causes a decrease in the flow of plate current through vacuum tube 5 and a resultant increase in the internal resistance of that vacuum tube. This increased internal resistance results in an increased potential drop across vacuum tube 5 with a resulting decrease in the potential across output terminals 7 and 10. As the circuit components of the regulator are directly coupled, there are no lengthy time constants involved and stabilization of the voltage across output terminals 7 and 10 is achieved almost instantaneously.

Should the output across terminals 7 and 10 tend to decrease, the sequence of regulation is in the opposite phase. Briefly, a decrease in the voltage across terminals 7 and 10 results in decreased filament voltage and a decrease in the plate current of vacuum tube 12. The decreased current results in an increase in the potential of plate 16 of vacuum tube 12 and grid 40 of vacuum tube 24. The potential of cathode 31 of vacuum tube 24 likewise increases and this increase is reflected in an increase in the potential of control grid 38 of vacuum tube 5. An increased current flows through vacuum tube 5 with a resultant decrease in the internal resistance of the tube. The voltage drop across the tube is thus decreased and the potential across regulated output terminals 7 and 10 will rise.

Consider now the effect of an increase in the voltage across the non-regulated supply 1. Such an increase would reflect itself as an increase in the potential across the output terminals 7 and 10. Now, even if resistance 42 were not in the circuit, there would be a reduction in the output across the terminals 7 and 10 in accordance with the sequence of operation as just outlined. The gain provided by the diode 12 and the amplifier 24 is not sufficient, however, to restore the voltage fully and the regulation would be in the order of approximately one per cent or two per cent. Now, rather than introduce additional stages of amplification to compensate for the lack of gain, the regulation can be greatly improved by the inclusion of the resistance 42. This has the important effect of improving the regulation so as to be in the order of .1% to .2%.

The effect of this resistance can be understood from the following description. As resistance 42 is connected between positive terminal 3 of the non-regulated supply 1 and the filament 11 of diode vacuum tube 12, part of the current flowing through the filament is directly dependent on the voltage of the supply 1. Thus, the filament 11 is heated not only by the output across terminals 7 and 10, but also by the input across the terminals 2 and 3 of the voltage supply 1. By proper choice of the resistance 42, enough additional current can be supplied to filament 11 to compensate for the lack of sufficient gain in the vacuum tubes 12 and 24.

Any change in the voltage across the supply 1 is immediately compensated for by a rapid heating of the filament 11 due to the component of the total filament current which flows through resistance 42 and said filament 11. This component current is in addition to that provided by the output voltage across terminals 7 and 10 and hence the amount of additional filament current thus obtained from the input supply can be controlled by the choice of resistance 42.

Furthermore, by proper choice of this resistance the regulation characteristic can readily be controlled. For example, assume an increase in the voltage across supply 1, by properly choosing the value of resistance 42, enough additional current can be supplied to filament 11 directly from the supply to cause an overcorrection sufficient to immediately reduce the output voltage to a predetermined value and hence the regulation can be kept flat even with a substantial rise in the voltage of supply 1.

In summary, it is thus seen that by the inclusion of resistance 42, enough additional filament current can be supplied to further change the plate current of the diode 12 to compensate for a lack of gain in the tubes and thereby improve the regulation characteristic. Further, any change in the input voltage is directly transmitted to the filament 11 of the diode 12 so that said filament can respond quickly to such changes. The filament current is thus directly and immediately varied due to any changes in either the input voltage across voltage supply 1 or the output voltage appearing at terminals 7 and 10.

Adjustment of the regulator is achieved by means of variable resistance 13 in series with filament 11 of vacuum tube 12. Increasing this resistance results in decreased potential across filament 11 and a resulting decrease in emission. Thus, by proper adjustment of this resistance, the resulting signal applied to control grid 38 of vacuum tube 5 can be controlled.

For purposes of simplifying the drawing, cathode heaters for vacuum tubes 5 and 24 have not been shown but this in no way deters from an understanding of the invention.

As the current supplied to the load at output terminals 7 and 10 must flow through vacuum tube 5, it is evident that the load capacity of the regulator may be readily increased by inserting additional vacuum tubes in parallel with the vacuum tube 5. Such a modification is readily apparent to one skilled in the art and hence the schematic drawing shows only one such tube.

It is also evident that other forms of controllable impedances can be substituted for vacuum tubes 5 and 24. Three element transistors may be employed for both these circuit elements without altering the operation of the device.

Furthermore, as the resulting output voltage is determined by the voltage of the potential source 1, less the voltage drop across the vacuum tube 5, it is apparent to one skilled in the art that there are various ways in which the present regulator may be adapted to provide a regulated output for various predetermined values of output voltage without changing the value of potential source 1. One such way would be to vary the fixed bias on vacuum tube 5 so that the internal resistance could be varied by the control grid over certain predetermined ranges.

While there has been here described one embodiment of the present invention, it will be manifest to one skilled in the art that various changes and modifications may be made therein without departing from the spirit of the invention. It is therefore aimed in the appended claims to cover all such changes and modifications as fall within the spirit and scope of the invention.

Having thus set forth the nature of my invention, what I claim is:

1. In a voltage regulator adapted to control the voltage output of a direct current supply within predetermined limits, an output circuit adapted to have a load connected therein, a non-linear impedance serially connected between said direct current supply and said output circuit, a balancing network having a variable impedance forming one arm thereof, a single potential source for supplying the current to said network, means for varying said variable impedance in accordance with voltage fluctuations in both the direct current supply and the output circuit, whereby a variation in the supply voltage, the output voltage or both results in a change in the value of said variable impedance, and said network having an output circuit connected to said non-linear impedance for varying said non-linear impedance in accordance with the output from said last mentioned output circuit.

2. In a voltage regulator adapted to control the voltage output of a direct current supply within predetermined limits, an output circuit adapted to have a load connected therein, a non-linear impedance serially connected between said direct current supply and said output circuit, a balancing network having a variable impedance forming one arm thereof, a single potential source for supplying the current to said network, a diode vacuum tube, means connected to said direct current supply for varying the impedance of said diode vacuum tube in accordance with the voltage of said direct current supply, means connected to said output circuit for varying the impedance of said diode vacuum tube in accordance with the voltage of said output circuit whereby the impedance of said diode vacuum tube is varied in accordance with fluctuations in the supply voltage, the output voltage or both, means for varying the impedance of the variable arm of said balancing network in accordance with the impedance of said diode vacuum tube, and said network having an output circuit connected in said non-linear impedance for varying said non-linear impedance in accordance with the output from said last mentioned output circuit.

3. In a voltage regulator adapted to control the voltage output of a direct current supply within predetermined limits, an output circuit adapted to have a load connected therein, vacuum tube means serially connected between said direct current supply and said output circuit, a bridge circuit having a variable impedance forming one arm thereof, a single potential source for supplying the current to said bridge circuit, a vacuum tube having at least a plate and a filament, a first resistance means connected between said direct current supply and said filament, a second resistance means connected between said output circuit and said filament whereby the filament current and hence plate current of said vacuum tube is determined by both the voltage of the supply and the voltage of the output, means for varying the impedance of the variable arm of said bridge in accordance with the plate current of said vacuum tube, a bridge output circuit connected to said vacuum tube means for varying the impedance of said vacuum tube means in accordance with the output from said bridge output circuit.

4. In a voltage regulator adapted to control the voltage output of a direct current supply within predetermined limits, an output circuit adapted to have a load connected therein, vacuum tube means serially connected between said direct current supply and said output circuit, said vacuum tube means having control grid means, a bridge circuit having a variable impedance forming one arm thereof, a single potential source for supplying the current to said bridge circuit, a vacuum tube having at least a plate and a filament, a first resistance means connected between said direct current supply and said filament, a second resistance means connected between said output circuit and said filament whereby the filament current and hence plate current of said vacuum tube is determined by both the voltage of the supply and the voltage of the output, means for varying the impedance of said arm of said bridge in accordance with the plate current of said vacuum tube, and a bridge output circuit connected to said control grid means whereby the impedance of said vacuum tube means is varied in accordance with the output from said bridge output circuit.

5. In a voltage regulator adapted to control the voltage output of a direct current supply within predetermined limits, an output circuit adapted to have a load connected therein, a vacuum tube means connected serially between said direct current supply and said output circuit, said vacuum tube means having control grid means, a bridge circuit, a single potential source for supplying the current to said bridge circuit, a first vacuum tube forming one arm of said bridge, a second vacuum tube having at least a plate and a filament, a first resistance means connected between said direct current supply and said filament, a second resistance means connected between said output circuit and said filament whereby the filament current and hence plate current of said second vacuum tube is determined by both the voltage of the supply and the voltage of the output, means for varying the impedance of said first vacuum tube in accordance with the plate current of said second vacuum tube, and a bridge output circuit connected to said control grid means whereby the impedance of said vacuum tube means is varied in accordance with the output from said bridge output circuit.

6. In a voltage regulator adapted to control the voltage of a direct current supply within predetermined limits, an output circuit adapted to have a load connected therein, a first vacuum tube having a plate circuit and a control grid circuit, said plate circuit being serially connected between said direct current supply and said output circuit, a bridge circuit comprising a first resistance, a second resistance, a third resistance and a second vacuum tube having a cathode, plate and control grid, said resistances being serially connected and said cathode being connected to said third resistance and said plate connected to said first resistance whereby said plate and cathode are in series with all of said resistances, a single potential source for supplying the current to said bridge circuit, a bridge output circuit from terminals between the first and second resistance and the cathode and third resistance respectively, a third vacuum tube having at least a plate and a filament, a resistance connected between said filament and said direct current supply, a resistance connected between said filament and said output circuit whereby the filament current and hence the impedance of said third vacuum tube is altered in accordance with variations in either the supply voltage or the output voltage or both, a direct electrical connection between the plate of said third vacuum tube and the control grid of said second vacuum tube, and electrical connection from said bridge output circuit to the control grid circuit of said first vacuum tube whereby variations in the voltage of said supply circuit or said output circuit causes variations in the output of said bridge circuit to thereby vary the impedance of said first vacuum tube and restore the output voltage to a predetermined value.

7. In a voltage regulator adapted to control the voltage output of a direct current supply within predetermined limits, an output circuit adapted to have a load connected therein, a non-linear impedance serially connected between said direct current supply and said output circuit, a balancing network having a variable impedance forming one arm thereof, means for varying said variable impedance in accordance with voltage fluctuations in both the direct current supply and the output circuit, whereby a variation in the supply voltage, the output voltage or both results in a change in the value of said variable impedance, and said network having an output circuit connected to said non-linear impedance for varying said non-linear impedance in accordance with the output from said last mentioned output circuit.

8. In a voltage regulator adapted to control the voltage output of a direct current supply within predetermined limits, an output circuit adapted to have a load connected therein, a non-linear impedance serially connected between said direct current supply and said output circuit, a balancing network having a variable impedance forming one arm thereof, a vacuum tube, means connected to said direct current supply for varying the impedance of said diode vacuum tube in accordance with the voltage of said direct current supply, means connected to said output circuit for varying the impedance of said diode vacuum tube in accordance with the voltage of said output circuit whereby the impedance of said diode vacuum tube is varied in accordance with fluctuations in the supply voltage, the output voltage or both, means for varying the impedance of the variable arm of said balancing network in accordance with the impedance of said diode vacuum tube, and said network having an output circuit connected in said non-linear impedance for varying said non-linear impedance in accordance with the output from said last mentioned output circuit.

9. In a voltage regulator adapted to control the voltage output of a direct current supply within predetermined limits, an output circuit adapted to have a load connected therein, vacuum tube means serially connected between said direct current supply and said output circuit, a bridge circuit having a variable impedance forming one arm thereof, a vacuum tube having at least a plate and a filament, a first resistance means connected between said direct current supply and said filament, a second resistance means connected between said output circuit and said filament whereby the filament current and hence the plate current of said vacuum tube is determined by both the voltage of the supply and the voltage of the output, means for varying the impedance of the variable arm of said bridge in accordance with the plate current of said vacuum tube, a bridge output circuit connected to said vacuum tube means for varying the impedance of said vacuum tube means in accordance with the output from said bridge output circuit.

10. In a voltage regulator adapted to control the voltage output of a direct current supply within predetermined limits, an output circuit adapted to have a load connected therein, vacuum tube means serially connected between said direct current supply and said output circuit, said vacuum tube means having control grid means, a bridge circuit having a variable impedance forming one arm thereof, a vacuum tube having at least a plate and a filament, a first resistance means connected between said direct current supply and said filament, a second resistance means connected between said output circuit and said filament whereby the filament current and hence the plate current of said vacuum tube is determined by both the voltage of the supply and the voltage of the output, means for varying the impedance of said arm of said bridge in accordance with the plate current of said vacuum tube, and a bridge output circuit connected to said control grid means whereby the impedance of said vacuum tube means is varied in accordance with the output from said bridge output circuit.

11. In a voltage regulator adapted to control the voltage output of a direct current supply within predetermined limits, an output circuit adapted to have a load connected therein, a vacuum tube means connected serially between said direct current supply and said output circuit, said vacuum tube means having control grid means, a bridge circuit, a first vacuum tube forming one arm of said bridge, a second vaccum tube having at least a plate and a filament, a first resistance means connected between said direct current supply and said filament, a second resistance means connected between said output circuit and said filament whereby the filament current and hence the plate current of said second vacuum tube is determined by both the voltage of the supply and the voltage of the output, means for varying the impedance of said first vacuum tube in accordance with the plate current of said second vacuum tube, and a bridge output circuit connected to said control grid means whereby the impedance of said vacuum tube means is varied in accordance with the output from said bridge output circuit.

12. In a voltage regulator adapted to control the voltage of a direct current supply within predetermined limits, an output circuit adapted to have a load connected therein, a first vacuum tube having a plate circuit and a control grid circuit, said plate circuit being serially connected between said direct current supply and said output circuit, a bridge circuit comprising a first resistance, a second resistance, a third resistance and a second vacuum tube having a cathode, plate and control grid, said resistances being serially connected and said cathode being connected to said third resistance and said plate connected to said first resistance whereby said plate and cathode are in series with all of said resistances, a bridge output circuit from terminals between the first and second resistance and the cathode and third resistance respectively, a third vacuum tube having at least a plate and a filament, a resistance connected between said filament and said direct current supply, a resistance connected between said filament and said output circuit whereby the filament current and hence the impedance of said third vaccum tube is altered in accordance with variations in either the supply voltage or the output voltage or both, a direct electrical connection between the plate of said third vacuum tube and the control grid of said second vacuum tube, and electrical connection from said bridge output circuit to the control grid circuit of said first vacuum tube whereby variations in the voltage of said supply circuit or said output circuit causes variations in the output of said bridge circuit to thereby vary the impedance of said first vacuum tube and restore the output voltage to a predetermined value.

LEO L. HELTERLINE, JR.

REFERENCES CITED

The following references are of record in the file of this patent:

UNITED STATES PATENTS

| Number | Name | Date |
| --- | --- | --- |
| 2,362,769 | Parratt et al. | Nov. 14, 1944 |
| 2,372,432 | Keizer | Mar. 27, 1945 |
| 2,438,831 | Szikai | Mar. 30, 1948 |